United States Patent [19]

Matsuzaki et al.

[11] Patent Number: 4,668,040

[45] Date of Patent: May 26, 1987

[54] ELECTRICAL CONNECTOR RECEPTACLE

[75] Inventors: Shuichi Matsuzaki; Akira Nakazawa, both of Tokyo, Japan

[73] Assignee: Hirose Electric Co., Ltd., Tokyo, Japan

[21] Appl. No.: 823,283

[22] Filed: Jan. 28, 1986

[30] Foreign Application Priority Data

Mar. 13, 1985 [JP] Japan .......................... 60-34724[U]
Jul. 23, 1985 [JP] Japan .......................... 60-111971[U]

[51] Int. Cl.$^4$ .................................................. H02B 1/02
[52] U.S. Cl. .................................. 339/125 R; 339/128
[58] Field of Search .................... 339/125 R, 126, 128, 339/134, 198 G, 182 R, 17 L, 17 LC, 17 LM; 248/27.3

[56] References Cited

U.S. PATENT DOCUMENTS 2,099,635 11/1937 MacFadden .................. 248/27.3 X
4,165,147 8/1979 Buck .............................. 339/182 R

FOREIGN PATENT DOCUMENTS 1192649 5/1970 United Kingdom ............ 339/125 R

*Primary Examiner*—Eugene F. Desmond
*Attorney, Agent, or Firm*—Yusuke Takeuchi

[57] ABSTRACT

An electrical connector receptacle to be mounted on a circuit board, which comprises a housing; a pair of projection members provided on opposite sides of the housing; and a pair of mounting members made of springy sheet metal each having an annular fixing portion having a central opening adapted to be snapped over the projection member and a pair of leg portions extending from the fixing portion and adapted to be inserted into mounting holes of the board. An electrical connector receptable to be mounted on a circuit board, which comprises an insulating housing a pair of projection members provided on opposite sides of the housing, each projection member having a through hole; and a pair of mounting members made of springy sheet metal and having a head portion to be provided from entering the through hole, and a pair of leg portions extending from the head portion and adapted to be inserted into mounting holes of the circuit board through the through hole, while said leg portions return outwardly within the through hole after the mounting member has been inserted.

7 Claims, 5 Drawing Figures

ELECTRICAL CONNECTOR RECEPTACLE

BACKGROUND OF THE INVENTION

1. Field of the Invention

The present invention relates generally to electrical receptacles and more particularly to an electrical connector receptacle having a pair of mounting pieces for engagement with a printed circuit board.

2. Description of the Prior Art

Japanese U.M. kokai Nos. 59-31,783 and 59-110,982 disclose electrical connector receptacles of the type to be mounted on a printed circuit board. These receptacles are provided with mounting projections having a slot on each side facing toward the board. These projections are inserted into mounting holes of the board for temporarily mounting the receptacle on the board while the individual contacts of the connector are soldered to the circuit conductors of the board for making electrical connections.

U.S. Pat. No. 4,221,458 issued to Hughes et al. on Sept. 9, 1980, discloses an electrical connector receptacle comprising an insulating housing having a plug-receiving opening and a number of stamped conductors mounted in the housing. The housing is mounted on the circuit board by means of integral locating pins which are received in circular openings in the circuit board and by latch arms having enlarged ends which are received in notches at the edge of the circuit board.

U.S. Pat. No. 4,274,691 issued to Abernethy et al. on June 23, 1981, discloses a modular jack comprising a molded dielectric base and one or more depending elongated feet molded with the base and having projecting latching shoulders adjacent to an end.

These prior projections, locating pins, or elongated feet, however, have had the following problems:

The projections, pins, or feet are formed integrally with the housing or base of a synthetic resin so that upon soldering they deform and lose their elasticity under the sölderiing heat. Consequently, the holding power of the receptacle on the board becomes so weak that the receptacle is elevated or completely separated from the board in soldering.

In the forementioned Kokai No. 59-31,738, the direction of the projections determines the direction in which the receptacle can be mounted on the board so that if the receptacle is to be mountecd in another direction, it is necessary to have another type of housing with projections in the desired direction.

In the aforementioned Kokai No. 59-110,982, the above problem has been sovled, but the projections or columns for temporary mount must ve provided in two directions so that the metal mold becomes complicated. In addition, the amount of projection is so large that it is impossible to place the receptacles closely side by side or adjacent to other components.

SUMMARY OF THE INVENTION

It is an object of the invention to provide an electrical connector receptacle that is free from such problems as described above.

In accordance with the invention there is provided an electrical connector receptacle having on opposite sides a pair of detachable mounting members made of sheet metal. Thus, they can withstand the soldering heat and keep their elasticity, a single common housing can be used even if the receptacle is mounted on the board in diffrent directions, and that the amount of production of the projection from the side of the housing is very small.

According to one aspect of the invention, the electrical connector receptacle is provided with a pair of mounting members for engagement with a printed circuit board, and the connector housing is provided on opposite sides with a pair of projection members over which the mounting members can be snapped.

According to another aspect of the invention, the connector housing is provided on opposite sides with a pair of projection members for supporting the mounting members. The projection member has a through hole for receiving the mounting member. It is preferred to provide the through hole adjacent to the side of the housing because the mounting member can be inserted along the side. It is also preferred to make the through hole cross-shaped so that the direction of inserting the mounting member can be selected.

Other and further objects, features and advantages of the invention will appear more fully from the following description.

DESCRIPTION OF THE PREFERRED EMBODIMENTS

Figure 1:
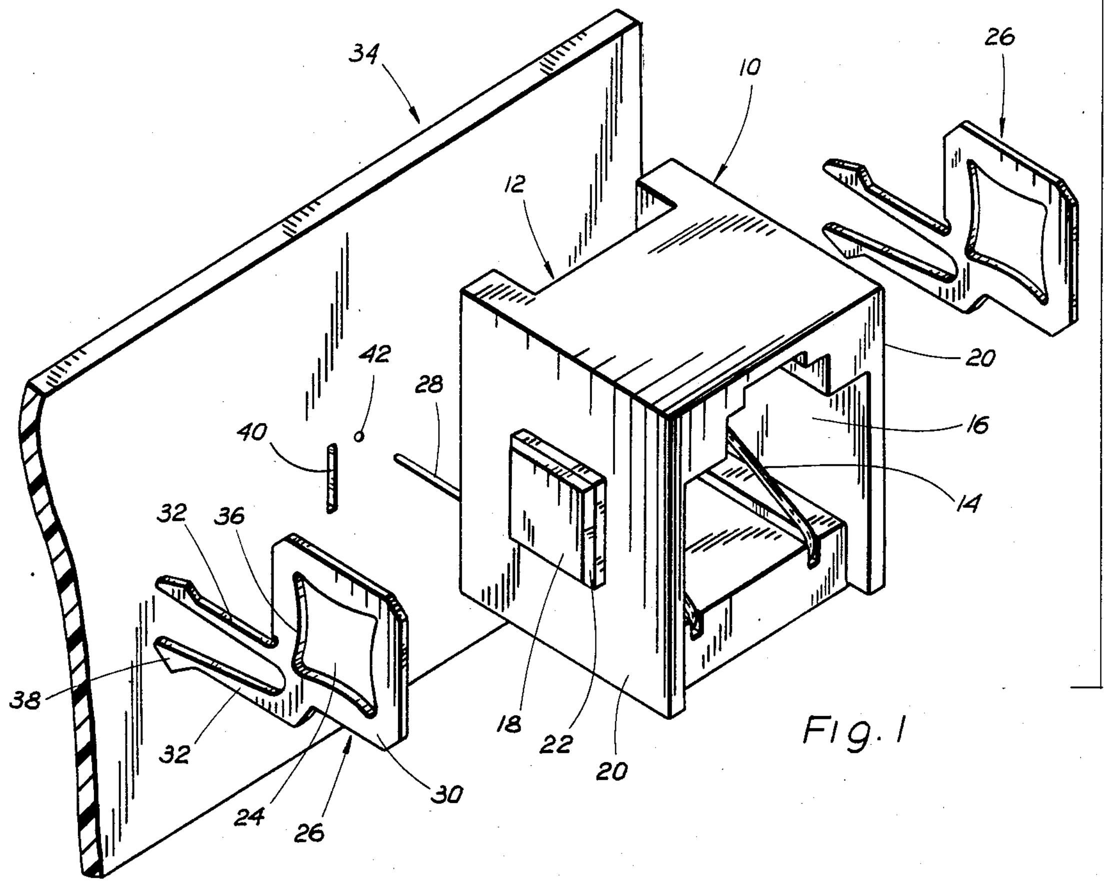
FIG. 1 is an exploded perspective view of an electical connector receptacle embodying the invention.

Referring now to the drawings, and more particularly to FIG. 1, there is shown an electrical connector receptacle 10 embodying the invention. The receptacle 10 comprises a rectangular parallelopiped insulating housing 12 made of plastic and a number of contacts 14 placed in the insulating housing. The insulating housing 12 has a plug-receiving cavity 16 from the front and a projection 18 about the center of either side 20. The projections are made rectangular, the edges 22 of which are tapered so as to ease the snap-on application of the central opening 24 of a mounting piece 26 hereinafter described. The shapes of the projection members and the central opening to snap over the projection are polygons so that when the mounting member is snapped over the projection member, the leg portions may be oriented firmly in the desired direction. This assures that a single common housing can be used for different desired directions of the leg portions by snapping the fixing portion over the projection at the desired angle.

Each of contacts 14 is made of a length of springy metal wire or strip, an end of which is bent diagonally from the front into the plug-receiving cavity 16 and the other end of which extends beyond the rear of housing 12 as a wiring portion 28.

Each mounting piece 26 may be made by stamping a springy metal sheet in such a manner that it may have a rectangular ring fixing portion 30 and a pair of leg portions 32 extending laterally from the lower left-hand edge of annualr fixing portion 30 as viewed in FIG. 1.

These leg portions are made asymmetric so that the location of the receptacle may be shifted relative to other components (not shown) on a printed circuit board 34. Also, the magnitude of mounting force can be increased by attaching a pair of mounting pieces 26 in such a manner that the leg portions of one mounting piece and the other may be placed on the upper and lower positions, respectively.

The fixing portion 30 is provided with a rectangular central opening 24 consisting of four inwardly arcked edges 36 for snapping over the projection 18 of housing 12. The tip of each leg portion 32 is provided with an enlarged end 38 for secure engagement with the board 34.

The receptcale 10 can be mounted on the circuit board 34 at the back of housing 12. The board 34 has mounting holes 40 and wiring holes 42 into which the leg portions 32 of mounting piece 26 and the wiring portions 28 of contacts 14 are inserted, respectively, to mount and solder the receptacle onto the board.

The connector receptacle thus constructed can be mounted on a circuit board as follows:

(1) First of all, the fixing portion 30 of mounting member 26 is snapped over the projection 18 of insulating housing 12, with the leg portions 32 oriented in the direction shown in FIG. 1. The arcked resilient edges 36 of central opening 24 are bent outward for easy snap-on but firm snap-off. The central opening 24 is rectangular so that the mounting piece 26 will not turn about the projection 18, thus keeping the leg portions 32 in the desired direction.

(2) Next, the wiring portion 28 of contact 14 and the leg portions 32 of mounting pieces 26 are inserted into the wiring holes 42 and mounting holes 40, respectively, of circuit board 34 provided at the back of housing 12 for temporarily fixing the connector receptacle on the circuit board.

(3) Finally, the back face of circuit board 34 is dipped in a liquid flux and then in a soldering bath to complete soldering the contacts to the circuit board.

Figure 2:
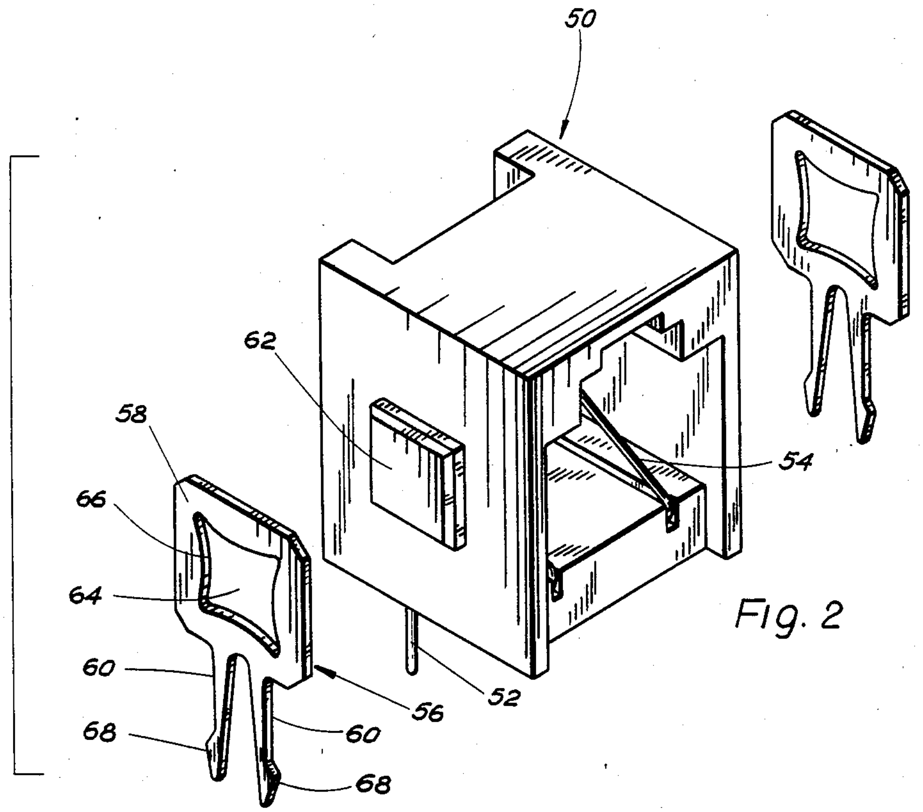
FIG. 2 is an exploded perspective view of another electrical connector receptacle embodying the invention.

FIG. 2 illustrates another embodiment having a pair of mounting pieces provided with leg portions in a different direction from that of FIG. 1. The insulating housing 50 is substantially the same as that of FIG. 1, and the detailed description is omitted. The wiring portions 52 of contacts 54, however, extend downwardly from the bottom of insulating housing 50. The structure of contacts 54 is otherwise the same as that of FIG. 1. The mounting piece 56 has a fixing portion 58 and a pair of leg portions 60 as the mounting piece of each FIG. 1, but the leg portions of FIG. 2 extend downwardly from the center of the lower edge of fixing portion 58 so that they may correspond to the mounting holes of a circuit board (not shown).

Figure 3:
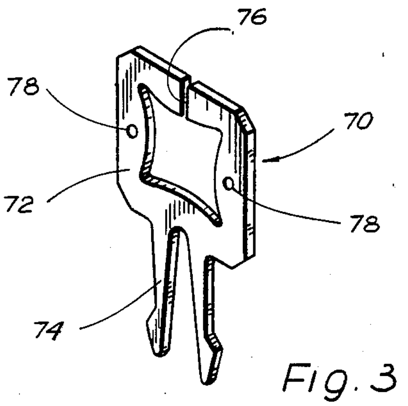
FIG. 3 is a perspective view of still another mounting piece embodying the invention.

FIG. 3 shows still another mounting piece 70 with which snapping is easier than with the other embodiments. Like the above two embodiments, this mounting piece has a fixing portion 72 and leg portions 74, but its fixing portions has a slit 76 on the upper side and a pair of holes 78 on opposite sides of the slit for receiving a pair of fingers of a tool (not shown) for expanding the slit. Thus, the mounting piece 70 can be easily snapped over the projection by inserting the tool into the holes 78 to expand the slit.

The mounting pieces 26 of FIG. 1 can, of course, be snapped over the projection 62 of housing 50 of FIG. 2 so that the leg portions 32 extend downward as the wiring portions 52 of contacts 54. Similarly, the mounting pieces 56 or 70 can be snapped over the projections 18 of housing 12 of FIG. 1 so that the leg portions 60 or 74 extend laterally from the rear of housing 12.

Figure 4:
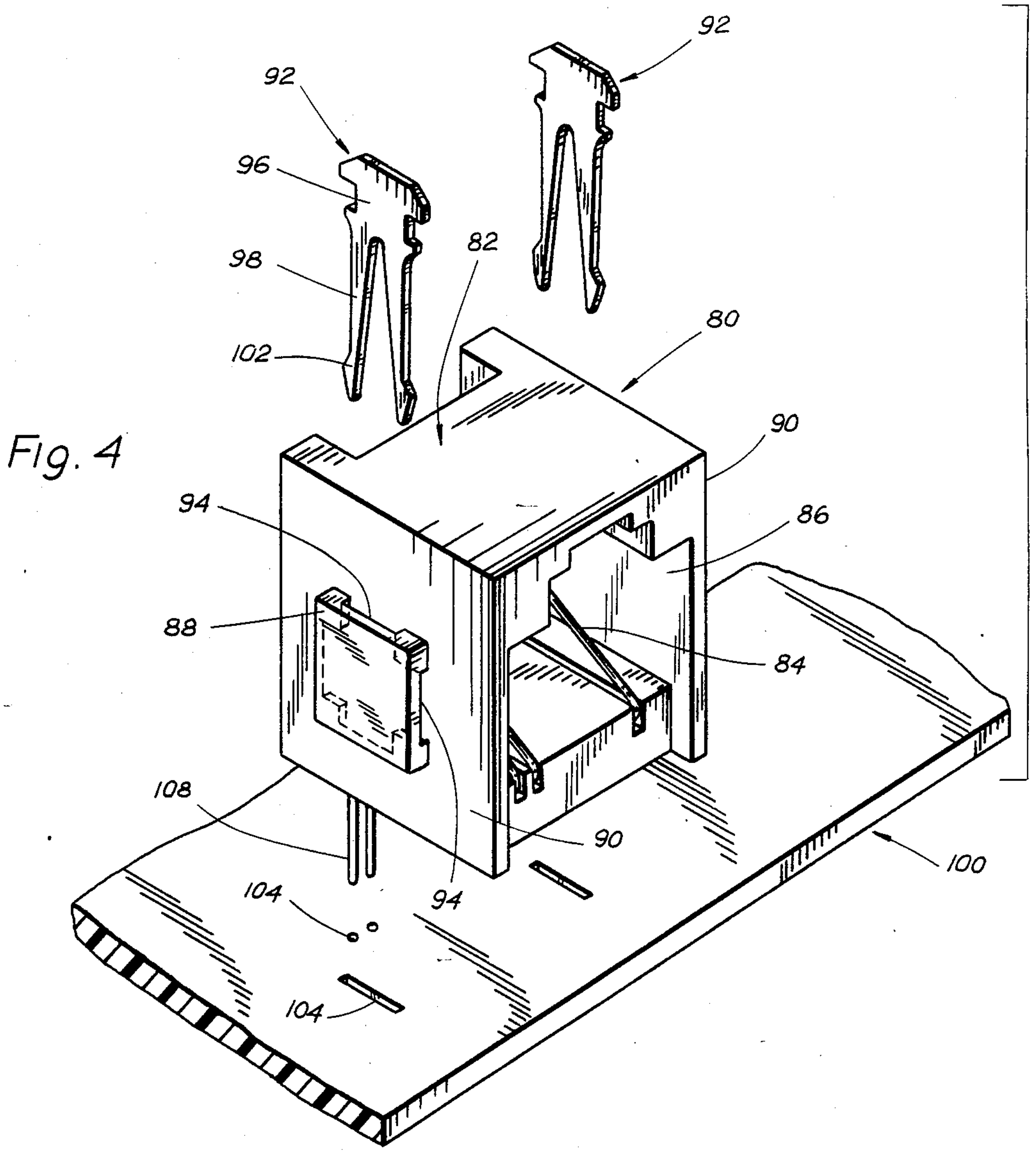
FIG. 4 is an exploded perspective view of another electrical connector receptacle embodying the invention.

FIG. 4 illustrates another electrical connector receptacle 80 embodying present invention. The receptacle 80 comprises a rectangular parallelopiped insulating housing 82 made of plastic and a number of contacts 84 in the insulating housing. The insulating housing 82 has a plug-receiving cavity 86 on the front and a pair of projections 88 about the centers of opposite sides 90 for supporting a pair of mounting members 92 hereinafter described.

The projection 88 of housing 82 has a through hole 94 for receiving the mounting member. The through hole 94 is formed crosswise on the side 90 of housing 82 and has a rectangular cross section corresponding to the flat shape of mounting member 92. The width of through hole 94 is made slightly smaller than that of the leg portions so that the through hole may compress the leg portions within the hole.

Each mounting piece 92 may be made by, for example, stamping a springy metal sheet in such a manner that it has a head portions 96 and a pair of leg portions 98. The head portion is made in such a shape and size that when the leg portions 98 are inserted into the through hole 94, it is blocked to enter the through hole . For example, the head portion 96 may be made larger than the width of the entrance of through hole 94, or bent outwardly in the direction normal to the side of housing 82. The length of leg portion 98 sould be sufficient to reach a printed circuit board 100 when the head portion 96 abouts against the entrance of the through hole 94. The leg portion has an enlarged end 102 for engagement with the circuit board 100.

The receptacle 80 can be mounted on the circuit board 100 at the back of housing 82. The board 100 has mounting holes 109 and wiring holes 106 into which the leg portions 98 of mounting piece 92 and the wiring portions 108 of contacts 84 are inserted, respectively.

The connector receptacle thus constructed is mounted on a printed circuit board as follows:

(1) First of all, the leg portions 98 of mounting piece 92 are compressed and inserted into the through hole 94 of projection 88 in such a manner that they may be oriented in the desired direction as shown in FIG. 4. When the head portion is further pushed down, the leg portions 98 go through the through hole 94 and the head portion abuts against the entrance of through hole 94. The leg portions 98 return outwardly with their elasticity to secure the mounting member 92 in place.

(2) Next, the wiring portions 108 of contact 84 and the leg portions 98 of mounting pieces 92 are inserted into the wiring holes 106 and mounting holes 104, respectively, of circuit board 100 provided at the back of housing 82 for temporarliy fixing the connector receptacle on the circuit board.

(3) Finally, the back face of circuit baord 100 is dipped in a liquid flux and then in a soldering bath to complete soldering the contacts to the circuit board.

Figure 5:
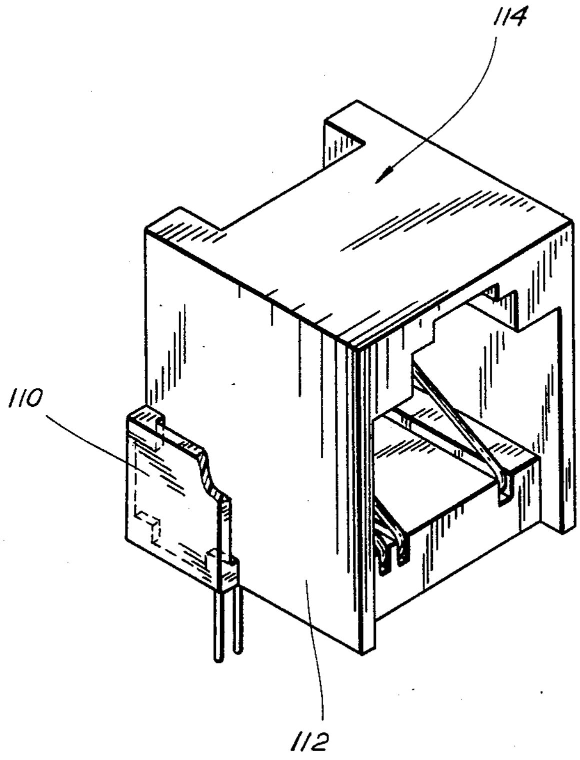
FIG. 5 is an exploded perspective view of still another electrical connector receptacle embodying the invention.

FIG. 5 shows still another embodiment having a pair of projections 110 provided at the lower position of opposite sides 112 of a housing 114. With this arrangement, the length of a mounting piece can be reduced, making the unit manufacturing cost lower and the strength higher.

According to the invention there are provided the following advantages:

(1) The mounting pieces, which are made of sheet metal, are so resistant to the soldering heat that they keep the desired mounting force throughout soldering, thus assuring good soldering results.

(2) The direction in which the connector receptacle is mounted on a board can be selected by attaching the mounting pieces to the projections at the desired direction so that only one type of housing is necessary regardless of the mounting direction.

(3) The form of the housing is so simple that the cost for manufacturing the metal mold can be reduced.

(4) The amount of projection of the housing projection is so small that the connector receptacles can be placed closely each other or to other components or parts, thus helping miniaturization of the equipment.

Having described our invention as related to the embodiment shown in the accompanying drawing, it is our intention that the invention be not limited by any of the details of description, unless otherwise specified, but rather be construed broadly within its spirit and scope of the invention set forth in the following claims.

What is claimed is:

1. An electrical receptacle to be mounted on a circuit board, which comprises:

a housing;

a pair of polygonal projection members provided on opposite sides of said housing; and a pair of mounting members made of springy sheet metal each having an annular fixing portion having a polygonal central opening at least one edge of which is arched inward so as to be snapped over said projection member and a pair of leg portions extending from said fixing portion and adapted to be inserted into mounting hole of said circuit board.

2. An electrical connector receptacle as recited in claim 1, wherein said fixing and leg portions are made flat in the same plane.

3. An electrical connector receptable to be mounted on a circuit board which comprises:

a housing:

a pair of projection members provided on opposite sides of said housing; and a pair of mounting menbers made of springy sheet metal each having annular fixing portion having a central opening adapted to be snapped over said projection member and a slit in the radial direction and a pair of leg portions extending from said fixing portion and adapted to be inserted into mounting hole of said circuit board.

4. An electrical connector receptacle as recited in claim 3, wherein said fixing portion has a pair of holes on opposite side of said slit so that a tool for expanding said slit may be inserted into said holes.

5. An electrical connector receptacle to be mounted on a circuit board, which comprises:

an insulating housing;

a pair of projection members provided on opposite sides of said housing, each projection member having at least one through hole; and a pair of mounting members made of springy sheet metal and having a head portion to be prevented from entering said through hole, and a pair of leg portions extending from said head portion and adapted to be inserted into mounting holes of said circuit board through said through hole, while said leg portions return outwardly within said through hole after said mounting member has been inserted.

6. An electrical connector receptacle as recited in claim 5, wherein the number of said through holes is two, with one intersecting the other at right angles.

7. An electrical connector receptacle as recited in claim 5, wherein said head and leg portions are made flat in the same plane.

* * * * *